US009326205B2

(12) United States Patent
Salkintzis

(10) Patent No.: US 9,326,205 B2
(45) Date of Patent: Apr. 26, 2016

(54) HANDOVER METHOD BASED ON SEAMLESS MOBILITY CONDITIONS

(71) Applicant: Google Technology Holdings LLC, Mountain View, CA (US)

(72) Inventor: Apostolis Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 2 days.

(21) Appl. No.: 14/270,600

(22) Filed: May 6, 2014

(65) Prior Publication Data

US 2015/0257066 A1 Sep. 10, 2015

Related U.S. Application Data

(60) Provisional application No. 61/947,449, filed on Mar. 4, 2014.

(51) Int. Cl.
*H04W 36/14* (2009.01)
*H04W 36/18* (2009.01)

(52) U.S. Cl.
CPC .............. *H04W 36/14* (2013.01); *H04W 36/18* (2013.01)

(58) Field of Classification Search
None
See application file for complete search history.

(56) References Cited

U.S. PATENT DOCUMENTS

| 8,687,547 | B2 * | 4/2014 | Collingrige | 370/328 |
| 2009/0070840 | A1 * | 3/2009 | Kamimaki et al. | 725/114 |
| 2011/0314482 | A1 * | 12/2011 | Cupala et al. | 719/328 |
| 2013/0242783 | A1 | 9/2013 | Horn et al. | |
| 2014/0040504 | A1 * | 2/2014 | Gupta | 709/244 |
| 2014/0177446 | A1 * | 6/2014 | Sun et al. | 370/236 |
| 2014/0293959 | A1 * | 10/2014 | Singh et al. | 370/331 |
| 2014/0328177 | A1 * | 11/2014 | Zhao et al. | 370/235 |
| 2015/0117209 | A1 * | 4/2015 | Lee et al. | 370/235 |
| 2015/0163704 | A1 * | 6/2015 | Catovic et al. | 370/331 |

OTHER PUBLICATIONS

Lampropoulos, George et al.: "Media-Independent Handover for Seamless Service Provision Heterogeneous Networks", IEEE Communications Magazine, Jan. 2008, pp. 64-71.

Qualcomm, "A 3G/LTE Wi-Fi Offload Framework: Connectivity Engine (CnE) to Manage Inter-System Radio Connections and Applications", Qualcomm Incorporated Jun. 2011, all pages.

European Patent Office; International Search Report and Written Opinion; International Application No. PCT/US2015/018751; dated May 28, 2015.

(Continued)

*Primary Examiner* — Kimberly A Williams
(74) *Attorney, Agent, or Firm* — Faegre Baker Daniels LLP

(57) ABSTRACT

Methods and apparatus for determining if seamless handover is required for mobile device network connections are disclosed. In one such method, a mobile device establishes connectivity to a public data network ("PDN") via a cellular network, determines the availability of a plurality of wireless local area networks ("WLANs"), at least one member of the plurality of WLANs providing connectivity to the PDN via the cellular network, and determines if a condition requiring seamless handover is present. If the condition requiring seamless handover is present, then the mobile device selects, from the plurality of WLANs, a trusted WLAN as the handover WLAN, the trusted WLAN being a WLAN that provides connectivity to the PDN via the cellular network.

20 Claims, 5 Drawing Sheets

(56) References Cited

OTHER PUBLICATIONS

3rd Generation Partnership Project; Technical Specification Group Services and System Aspects; Architecture Enhancements for Non-3GPP Accesses (Release 12); 3GPP Standard; 3GPP TS 23.402, 3rd Generation Partnership Project (3GPP); vol. SA WG2, No. V12.3.0, Dec. 13, 2013.

Small Cell Forum Ltd Integrated Femto-Wifi (IFW) Networks; from www.smallcellforum.org; Feb. 28, 2012.

Tomici, John L. et al.; Multi-RAT Traffic Offloading Solutions for the Bandwidth Crunch Problem; Systems, Applications and Technology Conference (LISAT), 2011 IEEE Long Island; May 6, 2011.

* cited by examiner

HANDOVER METHOD BASED ON SEAMLESS MOBILITY CONDITIONS

CROSS-REFERENCE TO RELATED APPLICATIONS

The present application claims priority to U.S. Provisional Patent Application 61/947,499, filed on Mar. 4, 2014, which is incorporated herein by reference in its entirety.

TECHNICAL FIELD

The present disclosure is related generally to wireless communications and, more specifically, to handover methods for offloading traffic from a cellular network to a wireless local area network ("WLAN").

BACKGROUND

The performance of Internet-based applications on mobile computing devices is affected by the capabilities of the underlying network technologies. To provide access to the Internet for applications on mobile devices, cellular wireless communication systems are widely deployed. Such systems may be multiple-access systems able to support communication with multiple users by sharing system resources such as bandwidth and transmission power. Commonly used multiple-access systems include, but are not limited to, Code-Division Multiple Access systems, Time-Division Multiple Access systems, Frequency-Division Multiple Access, 3rd Generation Partnership Project Long Term Evolution systems, Long Term Evolution Advanced systems, Orthogonal Frequency-Division Multiple Access systems, and the like.

Additionally or alternatively, a mobile computing device may connect to data communications networks via a WLAN. Example WLAN networks include, but are not limited to, WiFi networks, home WLANs, WLAN hotspots, public WLANs, private WLANs, and the like.

With an increasing number of mobile computing devices featuring WLAN-connectivity capability and with access to WLAN networks becoming more widely available, offloading data capabilities from a cellular network to a WLAN has emerged as an attractive feature for both cellular network operators and users. To that end, methods for offloading data capabilities by handing over the connection from the cellular network to a WLAN, or "connection handover methods," are used. A connection handover method may be used to establish a connection with a WLAN while disconnecting from a cellular network.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
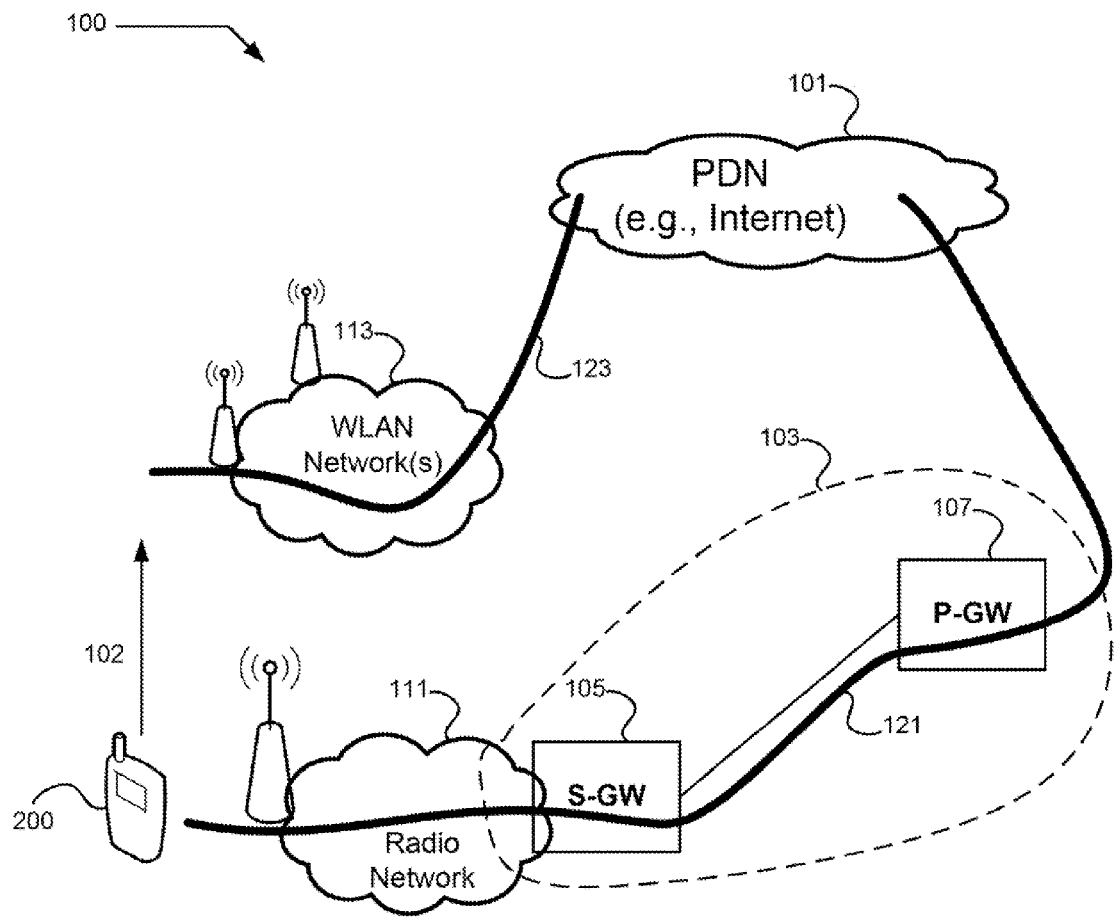
FIG. 1 illustrates an example access architecture for a WLAN and a cellular network interworking with non-seamless handover.

In providing a mobile device with data connectivity, operators desire to provide a seamless user experience in connectivity handover solutions to keep device users satisfied with device performance. Many disruptions that may cause a break in data service occur when a mobile device switches from cellular connectivity to WLAN connectivity.

Most current mobile devices employ non-seamless handover from a cellular access network to a WLAN access network. Non-seamless handover is characterized by a change in Internet Protocol ("IP") address and, therefore, the handover cannot provide seamless transition without potential network interruption. Generally, applications executed by the mobile device identify and react to non-seamless connectivity handovers by re-establishing their network connections or traffic streams. Although the re-establishment of network connections may consume battery life and cellular resources, such re-establishment may be considered acceptable behavior when it does not detrimentally impact the user experience. For example, a user browsing a web page may not have his user experience detrimentally affected by a non-seamless handover disruption, as the web page is not streaming data to the user as a continuous data stream. Other example non-streaming applications wherein such seamless handover may be acceptable may include, for example, but are not limited to, email applications, social-networking applications, instant-messaging applications, location-monitoring applications, and the like.

However, during the execution of some applications, a non-seamless handover is unacceptable because the communication session may be perceptibly interrupted. For example, a non-seamless handover during operation of streaming video or audio applications, voice over IP ("VoIP") applications, or any real-time or recorded content streaming applications will typically be noticed by the user As such, connectivity methods wherein the handover from cellular to WLAN is seamless ("seamless handover") may be employed to prevent such data interruption when the mentioned applications or the like are in use. In some example mobile devices, the mobile device may be programmed to have an application programming interface ("API") which allows applications to indicate that they require seamless handover. However, while executing a specific application may require seamless handover, other conditions may also require seamless handover, such as display activation, data-traffic analysis, access-network discovery and search function ("ANDSF") rules, and the like.

Seamless-handover methods do not impact the ongoing data flow, and applications do not need to identify and react to the handover, as they do in non-seamless handover situations. One characteristic that allows for seamlessness (i.e., no data interruption) during a handover to the preservation of the same IP address across both the cellular network and the handed-over to WLAN.

In an embodiment, a seamless handover method may include the use of "trusted" WLAN networks. A trusted WLAN is a WLAN that supports advanced security measures (such as Universal Subscriber Identity Module-based authentication) and is capable of providing one or more connections to the cellular network. Therefore, if a mobile device performs a handover from the cellular network to a trusted WLAN, then the IP address can be maintained because both networks have access to a common packet data network gateway ("P-GW"). This enables the handover to be seamless. Cellular network operators have deployed trusted WLAN networks and have integrated them within their core cellular network via network reference points or server gateways. Cellular operators may deploy trusted WLAN networks to offer access to operator-hosted IP services over such WLAN networks. Further, extended use of trusted WLANs may enable the cellular network operators to offer IP Multimedia System via WLAN.

As described above, a mobile device may have the option of either non-seamless handover or seamless handover from a cellular network to a trusted WLAN based on present conditions associated with the mobile device. Therefore, a method for providing connectivity handover for a mobile device from a cellular network to a local area network may determine if a condition requiring seamless handover is present. If such a condition is present, then the mobile device may employ seamless handover.

To that end, a method for providing connectivity handover for a mobile device is disclosed with respect to various embodiments of the present disclosure. The connectivity handover is a network handover from a cellular network to a handover WLAN. The method may include establishing connectivity to a public data network ("PDN") via the cellular network, determining the availability of one or more WLANs, and determining if a condition requiring seamless handover is present, the condition requiring seamless handover being associated with the mobile device. If a condition requiring seamless handover is present, then the method may entail determining if at least one of the one or more WLANs is a trusted WLAN and providing seamless handover to the PDN via the cellular network. A WLAN is trusted and provides seamless handover to the PDN via the cellular network if the WLAN supports an S2a interface with the cellular network. A WLAN may support an S2a interface with multiple cellular network carriers.

If at least one of the discovered WLANs is trusted and provides seamless handover to the PDN, then the mobile device selects one of such trusted WLANs and, during an authentication process with the WLAN, requests connectivity to the PDN via the cellular network. However, if no conditions requiring seamless handover are present or if the user device does not discover at least one WLAN that is trusted and provides seamless handover, then the mobile device selects any WLAN, and, during authentication with the WLAN, the mobile device does not request connectivity to the PDN via the cellular network.

Turning now to the drawings and with specific reference to FIG. 1, architecture 100 for the interworking of a WLAN and a cellular network with non-seamless mobility is shown. A mobile device 200 is first connected to a PDN such as the Internet 101 via a cellular connection 121. The cellular connection 121 transmits and receives data to or from the mobile device 200, routing said data through a cellular radio network 111 in operative connectivity with a cellular core network 103. The cellular core network 103 may send and receive packet data using a serving gateway 105 associated with the cellular radio network 111 and a P-GW 107. Thusly, the cellular connection provides connectivity to PDN data services (such as Internet data services) via the cellular network that is composed of the cellular network 111 and the cellular core network 103.

In the architecture 100, the mobile device 200 may perform a non-seamless connectivity handover 102 to change device connectivity from the cellular connection 121 to a WLAN connection 123. As mentioned above, a non-seamless connectivity handover 102 is characterized by a change in IP address and, therefore, the handover 102 cannot provide a seamless transition from the cellular connection 121 to the WLAN connection 123 without potential data interruption. The WLAN connection 123 provides the mobile device 200 with data services by connecting to the Internet 101 via WLAN networks 113. The WLAN networks 113 may include, but are not limited to, one or more WiFi networks, home WLANs, WLAN hotspots, public WLANs, private WLANs, and the like.

Figure 2:
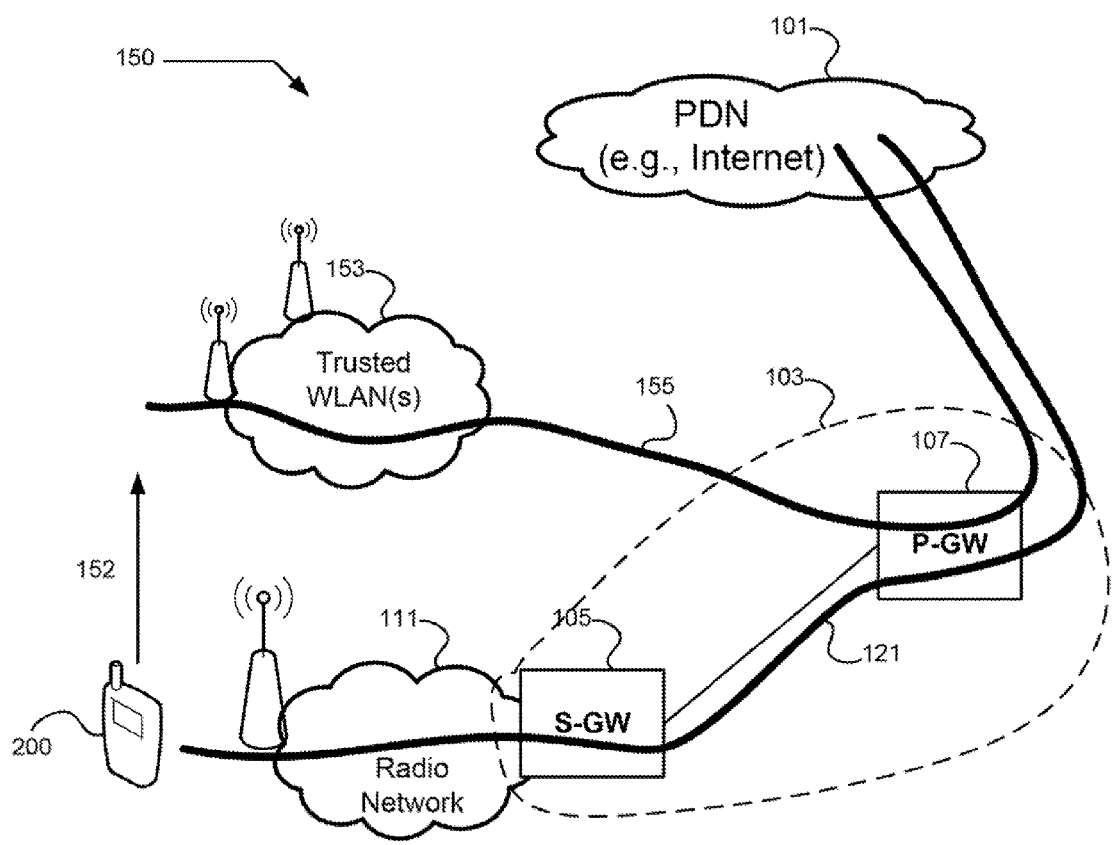
FIG. 2 illustrates a further example access architecture for a WLAN and a cellular network interworking with seamless handover.

Seamless handover methods may be employed using the architecture 150 shown in FIG. 2, the architecture 150 configured for the interworking of a WLAN and a cellular network. In the embodiment shown, the mobile device 200 is initially connected to a PDN (such as the Internet 101) via the cellular connection 121, in a manner analogous to the cellular connection 121 of FIG. 1. However, the architecture 150 is configured for seamless connectivity handover 152, wherein the network connection is handed over from the cellular connection 121 to a trusted WLAN connection 155. The seamless handover 150 may involve the use of trusted WLAN networks 153. The trusted WLAN connection 155 is a connection to a PDN 103. Because both the trusted WLAN connection 155 and the cellular connection 121 route via the P-GW 107 in the cellular core network 103, if the mobile device 200 performs a seamless handover 152 from the cellular connection 121 to the trusted WLAN connection 155, then an IP address associated with the mobile device 200 is maintained, and, thusly, seamless handover 152 is achieved. The trusted WLAN 153 supports an S2a interface (specified in 3GPP TS 23.402 v12.4.0) to P-GW 107 in order to enable seamless handover.

Figure 3:
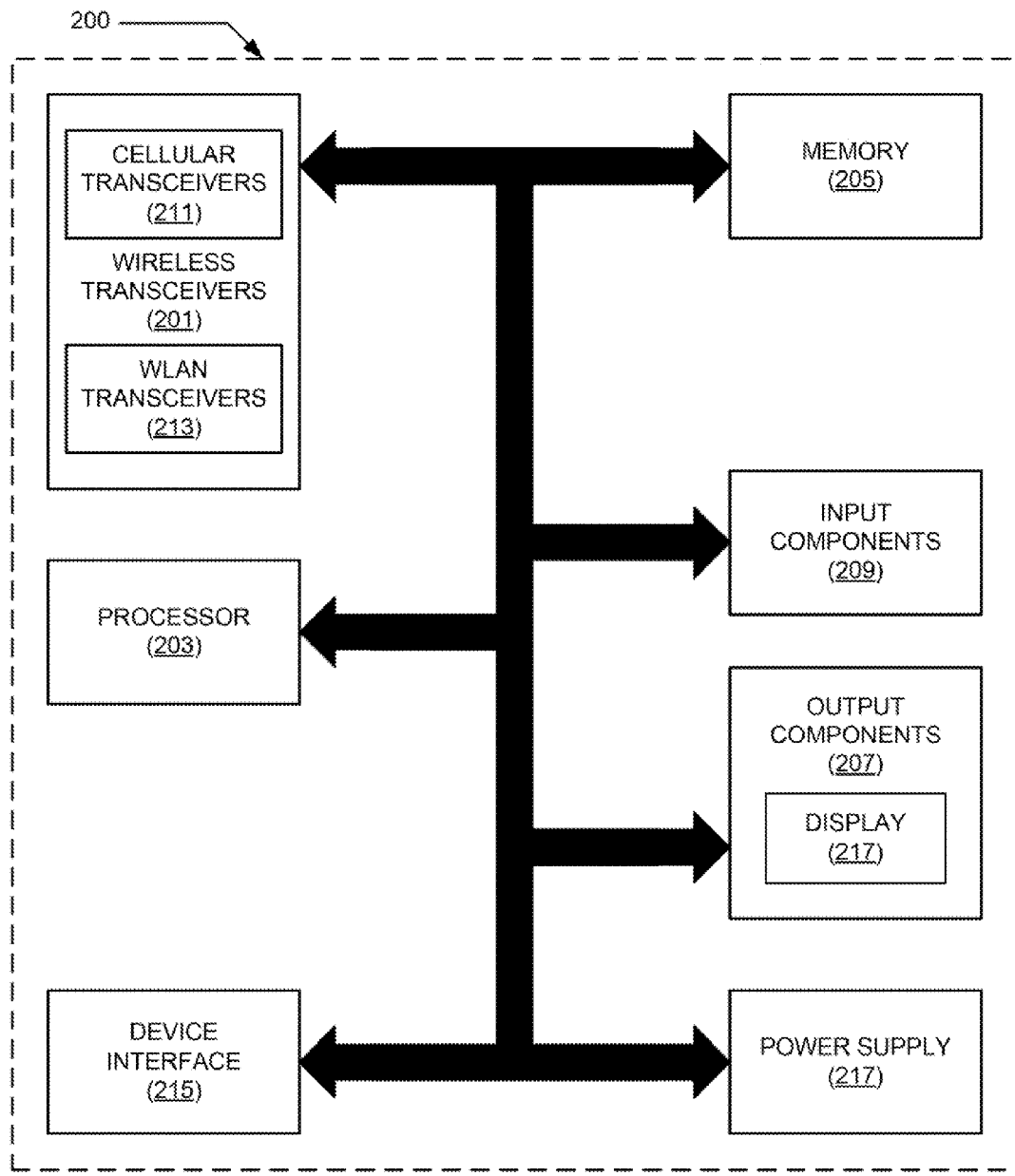
FIG. 3 is a generalized schematic of an example device within which embodiments of the presently disclosed principles may be implemented.

Further detailing components of an example mobile device 200, FIG. 3 is a block diagram representing example components which may be used in association with an embodiment of the mobile device 200. The example components may include, but are not limited to including, one or more wireless transceivers 201, a processor 203, one or more memories 205, one or more output components 207, and one or more input components 209. Each transceiver 201 may be a receiver, a transmitter, or both.

The cellular transceivers 211 may utilize wireless technology for communication, such as, but not limited to, cellular-based communications such as analog communications, digital communications, or next generation communications, as represented by the cellular transceivers 211. The cellular transceivers 211 may be configured to establish the cellular connection 121 to a PDN via the P-GW 107 in the cellular core network 103.

Further, the WLAN transceivers 213 may also utilize wireless technology for communication, such as, but not limited to, peer-to-peer or ad hoc communications such as HomeRF, ANT, Bluetooth, IEEE 802.11 (a, b, g, or n) or other forms of wireless communication such as infrared technology. The WLAN transceivers 213 may be employed to establish the WLAN connection 123 or the trusted WLAN connection 155 via the WLAN networks 113 or the trusted WLAN networks 153, respectively.

The internal components of the mobile device 200 may further include a device interface 215 to provide a direct connection to auxiliary components or accessories for additional or enhanced functionality. In addition, the internal components preferably include a power source or supply 217, such as a portable battery, for providing power to the other internal components, allowing portability of the mobile device 200.

Further, the processor 203 may generate commands based on information received from one or more input components 209. The processor 203 may process the received information alone or in combination with other data, such as the information stored in the memory 205. Thusly, the memory 205 of the internal components 200 may be used by the processors 203 to store and retrieve data. Additionally, the components may include any additional processors aside from the application processor 203.

The data that may be stored by the memory 205 may include, but are not limited to including, operating systems, applications, and data such as parameters and values. Each operating system includes executable code that controls basic functions of the electronic device, such as interaction among the components of the internal components, communication with external devices via each transceiver 201 or the device interface 215, and storage and retrieval of applications and data to and from the memory 205. Each application may include executable code utilizing an operating system to provide more specific functionality for the electronic device 200. Data are non-executable code or information that may be referenced or manipulated by an operating system or application for performing functions of the electronic device 200.

The input components 209, such as a user interface, may produce an input signal in response to detecting a keystroke, a predetermined gesture at a touch input, a voice command, and the like. The input components 209 may also include other sensors, such as a visible-light sensor, a motion sensor, and a proximity sensor.

Likewise, the output components 207 of the internal components may include one or more video, audio, or mechanical outputs. Specifically, the output components 207 include a display 217 in the form of a visual output component such as a cathode ray tube, liquid-crystal display, plasma display, incandescent light, fluorescent light, front or rear projection display, or a light-emitting diode indicator. Other examples of output components 207 may include an audio output component such as a speaker, alarm, or buzzer, or a mechanical output component such as vibrating or motion-based mechanisms.

It is to be understood that FIG. 3 is provided for illustrative purposes only and for illustrating components of an electronic device 200 in accordance with the present invention and is not intended to be a complete schematic diagram of the various components required for a mobile device 200. Therefore, the mobile device 200 may include various other components not shown in FIG. 2 or may include a combination of two or more components or a division of a particular component into two or more separate components and still be within the scope of the present disclosure.

Figure 4:
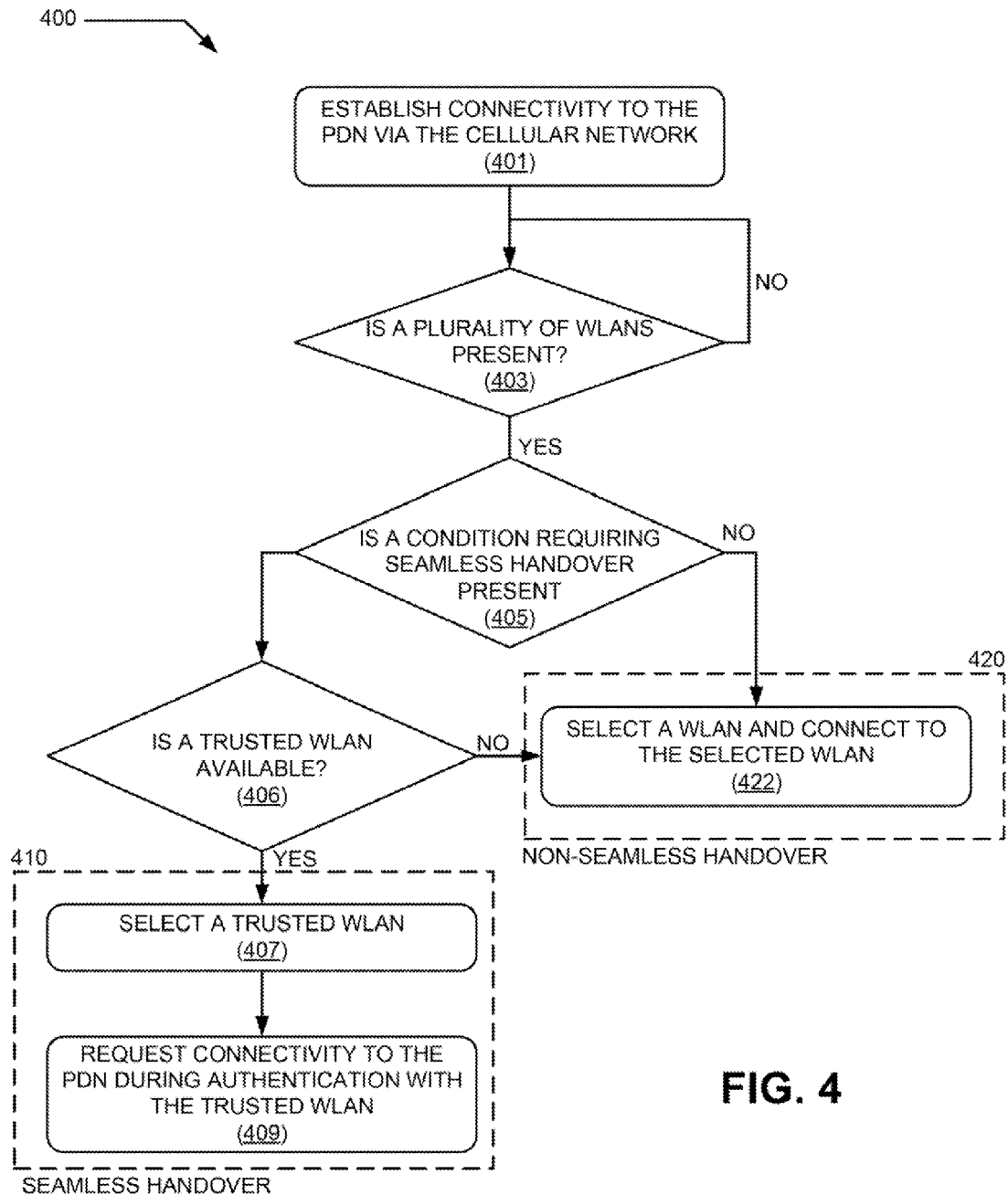
FIG. 4 is a flowchart of a representative method for selecting seamless mobility or non-seamless mobility based on conditions requiring seamless handover.

Turning now to FIG. 4, a flowchart exemplifying a method carried out by the mobile device 200 is shown. This method is applied whenever the mobile device 200 determines it is to handover the cellular connection 121 to a WLAN access network. Specifically, this method is applied by the mobile device 200 to determine whether the cellular connection 121 should be either non-seamlessly handed over to WLAN connection 123 (as in FIG. 1) or seamlessly handed over to WLAN connection 155 (as in FIG. 2).

At block 401, the mobile device 200 uses the cellular connection 121 to establish connectivity to the PDN 101. The mobile device 200 checks for the presence of one or more WLAN networks, including trusted WLAN networks (decision 403). If no WLAN network is present, then the mobile device 200 may continue checking for available WLAN networks. However, if a plurality of WLANs are detected, then the mobile device 200 determines if a condition requiring seamless handover is present (decision 405). If a condition requiring seamless handover is not present (decision 405), then the mobile device 200 selects and connects to an available WLAN network and establishes a WLAN connection 123 to the Internet (block 422). This WLAN connection 123 has a different IP address than the cellular connection 121. Subsequently, it releases the cellular connection 121, and further data communication with the Internet is carried over the WLAN connection 123. This completes a non-seamless handover 420 of the cellular connection 121 to the WLAN connection 123.

However, if a condition requiring seamless handover is present (decision 405), then the mobile device 200 determines (decision 406) if there is a trusted WLAN available that can provide S2a connectivity to the cellular core network 103 which is presently used to route data over the cellular connection 121. If no such WLAN is available, then the mobile device 200 executes the non-seamless handover 420. If, however, at least one trusted WLAN is discovered that can provide S2a connectivity to the cellular core network 103, then the mobile device 200 selects and connects to a trusted WLAN that can provide S2a connectivity to the cellular core network 103 (block 410). During the authentication procedure with the selected trusted WLAN, the mobile device 200 requests connectivity to the PDN (e.g., the Internet) via the P-GW 107 in the cellular core network 103 (block 409). After this step, the trusted WLAN connection 155 is established, which has the same IP address as the cellular connection 121, and subsequent data communication to the Internet is carried over the trusted WLAN connection 155.

Figure 5:
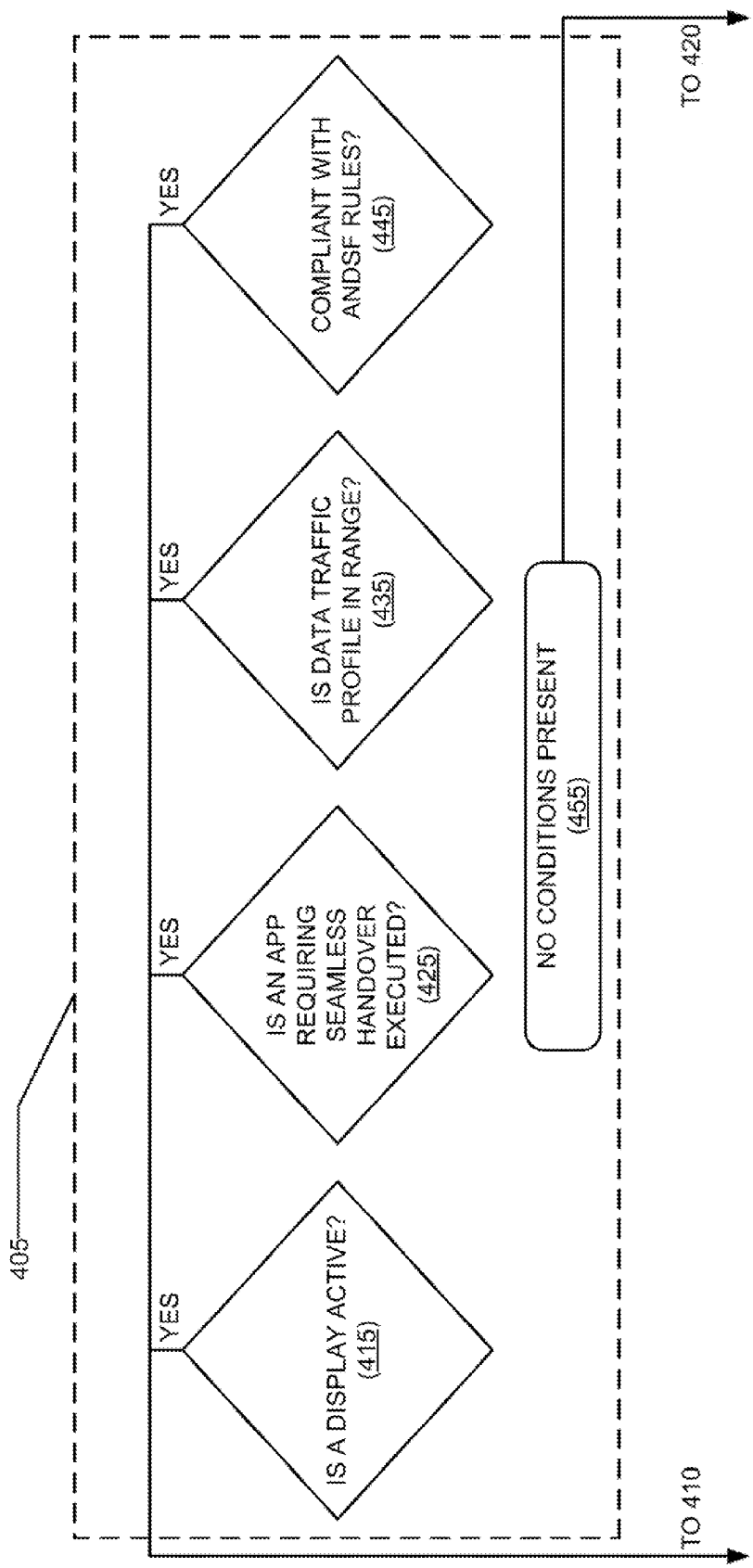
FIG. 5 is a flowchart expanding on the determination of conditions requiring seamless handover such as those of FIG. 4.

Seamless handover may be required during numerous operation states or scenarios and example scenarios requiring seamless handover are shown in FIG. 5, as an example expansion of the decision process 405. The conditions requiring seamless handover, however, are not limited to the conditions of FIG. 5 and additional conditions may be present to trigger seamless handover. Additionally, not all of the conditions listed must be present for the method 400 to perform seamless handover. However, if no recognized conditions requiring seamless handover are present (block 405), then the method 400 chooses non-seamless handover at block 420.

In some example embodiments, a condition requiring seamless handover may be the activation of the display 217 of the mobile device 200 (condition 415 of FIG. 5). For example, the display 217 may be a screen of the mobile device 200, and whenever the screen is activated, the mobile device 200 determines that seamless handover is required. The method 400 may include this condition because when a screen is "ON," the user of the mobile device 200 may interact with network applications and may not tolerate communication delays or error messages that may occur during non-seamless handover.

Another example condition is the execution of an application that requires seamless handover (condition 425 of FIG. 5). As mentioned above, applications requiring a constant stream of media may require seamless handover to prevent data interruption during use. Additionally, the mobile device 200 may maintain a list of applications which require seamless handover and employ seamless handover methods when an application on the list of applications is executed by the mobile device 200.

Further, the mobile device 200 may implement an API which allows application developers to program an application to inform the mobile device 200 that said application requires seamless handover during use. The mobile device 200, using the processor 203, may execute an API having a "seamless-handover lock" which locks the mobile device 200 into seamless handover during the use of applications which specify a need for seamless handover. Additionally, cellular network operator-branded walled-garden applications may employ such an API.

Data-traffic analysis may also be used to determine if a condition exists wherein seamless handover is required (condition 435 of FIG. 5). The mobile device 200 may analyze the data packet traffic flow transmitted to and from the mobile device 200. Traffic thresholds may be established for the mobile device 200 wherein if a data packet traffic flow associated with an IP address of the mobile device 200 exceeds the predetermined traffic flow threshold, then seamless handover is required. For example, a VoIP application may have a specific traffic profile (e.g., 50 to 60 packets/second, 80 to 150 bytes/packet); in such examples, the predetermined traffic flow threshold may be based on the traffic profile of the VoIP application. Further, the mobile device 200 may configure one or more traffic thresholds based on one or more applications, including operator-branded walled-garden applications. When the traffic analysis indicates that there is at least one traffic flow that matches a pre-configured traffic profile, then the mobile device 200 determines that seamless handover is needed.

The mobile device 200 may further determine if seamless handover is required by using provisioned ANDSF rules (condition 445 of FIG. 5). For example, if the mobile device 200 is triggered to connect to a WLAN by an ANDSF Inter-System Mobility Policy ("ISMP") rule, then the mobile device 200 assumes that seamless handover is required. If, for example, an operator-provided ISMP rule becomes active which indicates that access to the cellular core 103 is preferable over WLAN, then the mobile device 200 is triggered by this rule to select and connect to WLAN with seamless handover. Therefore, in this example, the ANDSF rule would provide a seamless handover to prevent interruptions in the connectivity between the mobile device 200 and a P-GW 107 in the cellular core network 103.

Further, example ANDSF rules which may be employed by the mobile device 200 may include rules based on Inter-System Routing Policy ("ISRP") rules, ISRP for multi-access PDN connectivity rules, Non-Seamless WLAN Offload rules, Inter-Access Point Name ("APN") Routing Policy rules, and the like, to determine if seamless mobility is required.

In another example, the mobile device determines that seamless handover is required by evaluating the provisioned ANDSF ISRP rules for multi-access PDN connectivity (referred to as "ISRP for MAPCON" rules). Such rules may indicate which radio access is the most preferable for PDN connections to specific APNs. For example, an ISRP for MAPCON rule may indicate that PDN connections to APN-x should preferably be established over WLAN (if and when available). Based on such rules, the mobile device 200 can determine that seamless mobility is required when it has a valid ISRP for MAPCON rule which indicates that the currently established PDN connection over cellular access should be established over WLAN. The mobile device 200 may also use other ANDSF rules to determine if seamless mobility is required. For example, the mobile device can be provisioned with ANDSF Inter-APN Routing Policy rules. Such rules indicate which PDN connection should be used for routing certain IP traffic, e.g., "route UDP traffic to port 5060 to the PDN connection with APN=ims." If the mobile device determines that no active IP flows should be routed inside an existing PDN connection, then it determines that seamless mobility is not required. Otherwise, it determines that seamless mobility is required.

In view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A method for providing connectivity handover for a mobile device from a cellular network to a handover wireless local area network ("WLAN"), the method comprising:
    establishing connectivity to a public data network ("PDN") via the cellular network;
    determining availability of one or more WLANs;
    determining that a condition requiring seamless handover is present, the condition requiring seamless handover being associated with the mobile device;
    determining that at least one of the one or more WLANs is a trusted WLAN, the trusted WLAN providing seamless handover to the PDN via the cellular network; and
    connecting to a handover WLAN comprising:
        based on the determinations that a condition requiring seamless handover is present and that at least one of the one or more WLANs is a trusted WLAN, selecting one of the at least one or more trusted WLANs as the handover WLAN and requesting connectivity to the PDN via the cellular network during an authentication with the handover WLAN.

2. The method of claim 1 wherein the selected trusted WLAN supports an S2a interface with the cellular network.

3. The method of claim 1 wherein the condition requiring seamless handover is activation of a display associated with the mobile device.

4. The method of claim 1 wherein the condition requiring seamless handover is the mobile device executing an application that requires seamless handover.

5. The method of claim 4 wherein the application requiring seamless handover is an application requiring at least one of transmission or reception of steaming media.

6. The method of claim 1 wherein the mobile device implements a public application programming interface ("API"), the public API allowing an application to generate a condition requiring seamless handover.

7. The method of claim 1 wherein the condition requiring seamless handover is that if a data packet traffic flow associated with an IP address of the mobile device exceeds a predetermined traffic flow threshold, then seamless handover is required.

8. The method of claim 1 further comprising determining that the condition requiring seamless handover is present by using one or more access network discovery and selection function ("ANDSF") rules.

9. The method of claim 8 wherein one of the ANDSF rules is that if the mobile device selects a WLAN for connection due to an ANDSF Inter-System Mobility Policy ("ISMP") rule, then seamless handover is required.

10. The method of claim 8 wherein one of the ANDSF rules is that if the mobile device selects a WLAN for connection and remains simultaneously connected to the cellular network, then the mobile device applies ISMP rules and seamless handover is required.

11. The method of claim 1 further comprising determining that the condition requiring seamless handover is present by using one or more Non-Seamless WLAN Offload rules.

12. The method of claim 1 further comprising determining that the condition requiring seamless handover is present by using one or more Inter-Access Point Name Routing Policy rules.

13. An apparatus for wireless communications by a mobile device, the apparatus comprising:
    a cellular transceiver for establishing connectivity to a public data network ("PDN") via a cellular network;
    a processor for determining that a condition requiring seamless handover is present, the condition requiring seamless handover being associated with the mobile device; and
    a wireless local area networks ("WLAN") transceiver configured for:
        determining availability of one or more WLANs;
        determining that at least one of the one or more WLANs is a trusted WLAN, the trusted WLAN providing seamless handover to the PDN via the cellular network; and
        connecting to a handover WLAN comprising:
            based on the determinations that a condition requiring seamless handover is present and that at least one of the one or more WLANs is a trusted WLAN, selecting one of the at least one or more trusted WLANs as the handover WLAN and requesting connectivity to the PDN via the cellular network during an authentication with the handover WLAN.

14. The apparatus of claim 13 wherein the selected trusted WLAN supports an S2a interface with the cellular network.

15. The apparatus of claim 13 further comprising a display, wherein the condition requiring seamless handover is activation of the display.

16. The apparatus of claim 13 further comprising a memory, wherein the condition requiring seamless mobility is the processor executing an application stored on the memory, the application requiring seamless handover.

17. The apparatus of claim 13 further comprising a memory, wherein the application requiring seamless handover is an application requiring at least one of transmission or reception of steaming media.

18. The apparatus of claim 13 further comprising a memory, the memory storing a public application programming interface ("API") to be executed by the processor, the public API allowing an application to generate a condition requiring seamless handover.

19. The apparatus of claim 13 wherein the condition requiring seamless handover is that if a data packet traffic flow associated with an IP address of the mobile device exceeds a predetermined traffic flow threshold, then seamless handover is required.

20. The apparatus of claim 13 wherein the condition requiring seamless handover is determined by using one or more ANDSF rules.

* * * * *